Patented June 5, 1951

2,555,927

UNITED STATES PATENT OFFICE 2,555,927

HYDROXYLATION OF UNSATURATED COMPOUNDS

Chester M. Himel, Palo Alto, Calif., and Lee O. Edmonds, Bartlesville, Okla., assignors to Phillips Petroleum Company, a corporation of Delaware No Drawing. Application May 25, 1949, Serial No. 95,386

15 Claims. (Cl. 260—635)

This invention relates to the hydroxylation of unsaturated compounds. In one of its aspects the invention relates to the hydroxylation of organic compounds containing at least one olefinic linkage or bond per molecule. In another of its aspects the invention relates to the hydroxylation of an unsaturated compound using hydrogen peroxide and a novel catalyst. In still another of its aspects the invention relates to the production of polyhydroxy alcohols and acids by hydroxylation of olefinic hydrocarbons and unsaturated organic acids, respectively, using hydrogen peroxide and employing a novel catalyst which has permitted attainment of important advantages which are set forth below. In one embodiment of the invention polyhydroxy alcohols and polyhydroxy acids are prepared by hydroxylation of olefinic linkages in compounds containing the same using hydrogen peroxide and a novel catalyst comprising a selected alkyl formate as set forth more fully below.

The hydroxylation of a compound containing an olefinic linkage has been known and practiced for a long time. Thus, in one method ethylene has been treated with alkaline permanganate to prepare ethylene glycol. In another method hydrogen peroxide and acetic acid have been used to prepare ethylene glycol.

In copending application Serial No. 744,526, filed April 28, 1947, by Chester M. Himel and Lee O. Edmonds, there is disclosed and claimed a process for the production of a polyhydroxy organic material which comprises treating an aliphatic type organic material containing at least two olefinic linkages with hydrogen peroxide in presence of formic acid as catalyst.

In one or more of the foregoing processes either high concentrations of hydrogen peroxide are required or recovery of the product is rendered difficult because of the formation of an azeotrope. Thus, with acetic acid as a catalyst the concentration of hydrogen peroxide required is generally above 60 per cent. With formic acid, which will catalyze the reaction with a lower concentration of hydrogen peroxide, there is formed a maximum boiling water azeotrope comprising about 70 per cent formic acid and boiling at about 108° C. Therefore, when formic acid has been employed as the catalyst, upon distillation of the reaction mixture, water will be removed until the azeotropic concentration of the acid has been reached and from that stage of the distillation the desired hydroxylated product will be in intimate contact with 70 per cent formic acid at a temperature of about 108° C. This prolonged contact of the desired hydroxylated product with the 70 per cent formic acid at the said temperature of 108° C. causes extensive esterification of the desired product. It is at once apparent, from the foregoing, that recovery of both the desired product and of the catalyst is greatly reduced and difficult.

One of the objects accomplished by the present invention is the provision of a process for the hydroxylation of olefinic or unsaturated organic compounds using hydrogen peroxide in the presence of a catalyst novel for this reaction which catalyst not only permits use of an hydrogen peroxide having a low concentration but at the same time permits ready and easy recovery of both the desired product and the catalyst by simple distillation without contact of the desired product with an acid material at an elevated temperature, thereby avoiding entirely the esterification encountered in the prior art as well as its attendant effect upon both the yield and recovery of the desired product and upon the recovery of the acid there employed.

As stated the novel catalyst employed in the process of the invention is a selected alkyl formate. The catalysts of the invention comprise alkyl formates boiling below about 100° C. Thus, methyl formate, ethyl formate and the propyl formates are within the operative scope of the invention.

Thus, according to the present invention there is provided a process for the hydroxylation of an unsaturated organic compound having at least one olefinic linkage by treating said compound with hydrogen peroxide in the presence of a catalyst comprising a low boiling alkyl formate, for example, methyl formate, ethyl formate or a propyl formate.

With the catalyst of this invention a high degree of conversion is realized and, as stated, hydrogen peroxide reagent of low concentration can be used and the recovery of both the desired product and the catalyst is accomplished with ease.

The quantity of catalyst employed will be in the range of from about 5 to about 200 mol per cent, preferably 50 to 100 mol per cent, based upon the hydrogen peroxide reagent used.

The quantity of hydrogen peroxide used will be at least about one mol for each olefinic linkage to be hydroxylated. Preferably, an excess of from about 10 to 20 per cent of hydrogen peroxide will be used. The hydrogen peroxide can be used as an aqueous solution having a concentration of from about 5 to about 75 weight per cent, preferably 5 to about 15 weight per cent.

The rate of reaction is a function of the amount of catalyst used and of the concentration of the hydrogen peroxide reagent employed. When both are at a high value, the reaction is so rapid as to become difficult to control. On the other hand in the absence of the catalyst, even with highly concentrated hydrogen peroxide, reaction velocity is reduced to a negligible figure. We have found that by operating with aqueous hydrogen peroxide having a concentration of from five to fifteen weight per cent and with the amount of catalyst being from 50 to 100 mol per cent based on the peroxide, commercially feasible reaction rates can be realized.

According to a preferred embodiment of our process, the catalyst is admixed with the olefinic compound to be hydroxylated and charged to a suitable reactor. The hydrogen peroxide is then introduced and the reactor sealed. During the reaction period, usually from 12 to 48 hours, the mixture is agitated at a temperature in a range between 25 and 100° C. The reaction mixture is then removed and fractionated. The catalyst, having a low boiling point, is recovered almost quantitatively, after which the water, and finally the product distills.

The present invention is applicable to the hydroxylation of olefinic linkages in monoolefins, diolefins, unsaturated fatty acids, unsaturated alcohols, and the like. It is also applicable to the hydroxylation of aliphatic olefinic compounds which have been substituted with a cyclic or ring structure compound, for example styrene. Also, a cyclic olefinic compound may be employed which has been substituted with a saturated compound, for example methyl or ethyl cyclohexene. Butadiene can be hydroxylated to erythritol and/or butene diol; monoolefins to glycols, cyclic olefins such as cyclohexene to the corresponding diol, unsaturated fatty acids to dihydroxy carboxylic acids, etc.

*Example I*

A reactor was charged with 2.78 mols of butadiene and 6.0 mols of methyl formate. To this mixture was added 6.0 mols of hydrogen peroxide (10 weight per cent solution). The reactor was then sealed and the contents agitated at 50° C. At the end of a 24 hour reaction period the reactor was opened and the contents fractionated. Recovery of the methyl formate catalyst was substantially quantitative. The hydroxylated product comprised 0.80 mol of meso-erythritol, 0.80 mol of dl-erythritol, and 0.42 mol of 3-butene-1,2-diol. Utilization of butadiene was 73 per cent of theoretical.

*Example II*

A run similar to that of Example I was made in which an excess of butadiene was used. Four mols of butadiene, four mols of methyl formate, and four mols of hydrogen peroxide were charged (10 weight per cent solution). The run was continued for 24 hours at 50° C. By fractionation of the reaction mixture the catalyst was recovered together with 1.7 mols of unreacted butadiene. The product comprised 0.40 mol of meso-erythritol, 0.40 mol of dl-erythritol and 1.0 mol of 3-butene-1,2-diol.

*Example III*

Hydroxylation of cyclohexene was carried out in a manner similar to that described for buta-diene in Example I. Five per cent excess hydrogen peroxide was employed and the quantity of methyl formate catalyst was equivalent in mols to the hydrogen peroxide used. The total reaction time was 28 hours and the temperature 50° C. A yield of crystalline diol obtained was 76 per cent of theoretical. Melting point of the product was about 97° C.

*Example IV*

2-butene was hydroxylated according to the procedure of Example III. The reaction time was 24 hours and the temperature 50° C. The dihydroxy butane product had a refractive index $n_D^{20}$ 1.4325 and boiled at 50–56° C. under 1 mm. pressure. The yield was 85 per cent of theoretical.

*Example V*

1-butene was hydroxylated according to the procedure of Example III. The reaction time was 24 hours and the temperature 50° C. The diol product boiled at 68° C. at 0.4 mm. and had a refractive index of $n_D^{20}$ 1.4375. The bis-phenyl-urethane derivative was prepared and had a melting point of 116–117° C.

*Example VI*

Styrene was hydroxylated using the procedure of Example III. The yield of diol obtained was about 40 per cent of theory. When recrystallized from hexane the product had a melting point of 62–64° C.

Reasonable variation and modification are possible within the scope of the appended claims to the invention the essence of which is that an unsaturated organic compound having at least one olefinic linkage has been hydroxylated with low hydrogen peroxide concentrations to obtain high yields of desired products without difficulty and with recovery of the catalyst as aforesaid.

We claim:

1. The hydroxylation of an organic compound having at least one olefinic linkage by contacting it with hydrogen peroxide in the presence of a low boiling alkyl formate.

2. The hydroxylation of an aliphatic compound having at least one olefinic linkage by contacting it at a temperature in the range 25–100° C. with hydrogen peroxide having a concentration of from 5–75 weight per cent in the presence of a low boiling alkyl formate.

3. The hydroxylation of a substituted compound having at least one olefinic linkage by contacting it at a temperature in the range 25–100° C. with hydrogen peroxide having a concentration of from 5–75 weight per cent in the presence of a low boiling alkyl formate.

4. The hydroxylation of a cyclic compound having at least one olefinic linkage by contacting it at a temperature in the range 25–100° C. with hydrogen peroxide having a concentration of from 5–75 weight per cent in the presence of a low boiling alkyl formate.

5. The process of claim 1 wherein the organic compound is butadiene, the temperature is in the range 25–100° C., at least one mol of hydrogen peroxide is present per olefinic linkage to be hydroxylated and 5–200 mol per cent of the alkyl formate, based upon the hydrogen peroxide reagent used, is employed.

6. The process of claim 5 wherein the alkyl formate is methyl formate.

7. The process of claim 1 wherein the organic compound is a butene, the temperature is in the range 25–100° C., at least one mol of hydrogen peroxide is present per olefinic linkage to be hydroxylated and 5-200 mol per cent of the alkyl formate, based upon the hydrogen peroxide reagent used, is employed.

8. The process of claim 7 wherein the alkyl formate is methyl formate.

9. The process of claim 1 wherein the organic compound is styrene, the temperature is in the range 25-100° C., at least one mol of hydrogen peroxide is present per olefinic linkage to be hydroxylated and 5-200 mol per cent of the alkyl formate, based upon the hydrogen peroxide reagent used, is employed.

10. The process of claim 9 wherein the alkyl formate is methyl formate.

11. The process of claim 1 wherein the organic compound is cyclohexene, the temperature is in the range 25-100° C., at least one mol of hydrogen peroxide is present per olefinic linkage to be hydroxylated and 5-200 mol per cent of the alkyl formate, based upon the hydrogen peroxide reagent used, is employed.

12. The process of claim 11 wherein the alkyl formate is methyl formate.

13. A process for the hydroxylation of an organic compound having at least one olefinic linkage which comprises the steps of contacting said organic compound with hydrogen peroxide in the presence of a low boiling alkyl formate for a time sufficient to form the desired hydroxylated compound and then distilling and fractionating the reaction mass thus produced to recover said hydroxylated compound and said low boiling alkyl formate thereby avoiding substantially any esterification.

14. The process of claim 13 wherein the temperature during the hydroxylation is in the range 25-100° C., hydrogen peroxide having a concentration of 5-75 weight per cent is employed, and 5-200 mol per cent of the alkyl formate is used.

15. A process according to claim 14 wherein said organic compound is butadiene.

CHESTER M. HIMEL.
LEE O. EDMONDS.

REFERENCES CITED

The following references are of record in the file of this patent:

UNITED STATES PATENTS

| Number | Name | Date |
|---|---|---|
| 2,138,917 | Grun | Dec. 6, 1938 |
| 2,304,064 | Scanlan et al. | Dec. 8, 1942 |
| 2,373,942 | Bergsteinsson | Apr. 17, 1945 |
| 2,414,385 | Milas | Jan. 14, 1947 |
| 2,437,648 | Milas | Mar. 9, 1948 |

OTHER REFERENCES

Jour. Am. Chem. Soc., vol. 67, pages 1786-9 (1945) (Swern et al.).

Jour. Am. Chem. Soc., vol. 68, pages 1504-7 (1946) (Swern et al.).